US012682436B2

(12) United States Patent
Sadi et al.

(10) Patent No.: US 12,682,436 B2
(45) Date of Patent: Jul. 14, 2026

(54) LEVERAGING DATA DISTORTION FOR SYNTHESIZING HIGH-RESOLUTION DATA

(71) Applicant: SAMSUNG ELECTRONICS CO., LTD., Gyeonggi-do (KR)

(72) Inventors: Sajid Sadi, San Jose, CA (US); Varun Menon, Mountain View, CA (US); Siddarth Ravichandran, Santa Clara, CA (US); Hyun Jae Kang, Mountain View, CA (US); Anil Unnikrishnan, Dublin, CA (US); Anthony Sylvain Jean-Yves Liot, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 349 days.

(21) Appl. No.: 18/433,157

(22) Filed: Feb. 5, 2024

(65) Prior Publication Data

US 2024/0394855 A1      Nov. 28, 2024

Related U.S. Application Data

(60) Provisional application No. 63/468,474, filed on May 23, 2023.

(51) Int. Cl.
| | |
|---|---|
| *G06T 5/80* | (2024.01) |
| *G06T 13/40* | (2011.01) |
| *G06V 10/25* | (2022.01) |

(52) U.S. Cl.
CPC ............... *G06T 5/80* (2024.01); *G06T 13/40* (2013.01); *G06V 10/25* (2022.01)

(58) Field of Classification Search
CPC ........... G06T 5/80; G06T 13/40; G06T 11/00; G06V 10/25
(Continued)

(56) References Cited

U.S. PATENT DOCUMENTS

| | | | |
|---|---|---|---|
| 11,158,102 B2 | 10/2021 | Liu et al. | |
| 2021/0201472 A1* | 7/2021 | Sohn | G06T 7/70 |

(Continued)

FOREIGN PATENT DOCUMENTS

| | | |
|---|---|---|
| CM | 113554737 A | 10/2021 |
| CN | 113609255 A | 11/2021 |

OTHER PUBLICATIONS

Siarohin, A. et al., "First order motion model for image animation," Advances in Neural Information Processing Systems, vol. 32, 2019.
(Continued)

*Primary Examiner* — Ali Bayat
(74) *Attorney, Agent, or Firm* — Kevin T. Cuenot

(57) ABSTRACT

Synthesizing high-resolution data includes distorting, with a distortion function, a region of interest (ROI) within an input of inferential data. The distorting generates distortion data within which the ROI is enhanced relative to other regions of the distortion data. A generative artificial intelligence (AI) model generates synthetic data in response to input of the distortion data. The generative AI model is trained against a distorted ground truth generated using the distortion function to distort one or more regions of interest ROI within source data used to guide the generative AI model in generating the synthetic data.

20 Claims, 15 Drawing Sheets
(4 of 15 Drawing Sheet(s) Filed in Color)

(58) Field of Classification Search
USPC ........................................................ 382/275
See application file for complete search history.

(56) References Cited

U.S. PATENT DOCUMENTS

| | | | |
|---|---|---|---|
| 2021/0327404 A1 | 10/2021 | Savchenkov et al. | |
| 2023/0042654 A1 | 2/2023 | Zhang | |
| 2023/0156207 A1* | 5/2023 | Yang .................... | H04N 19/147 |
| | | | 375/240.03 |
| 2023/0162487 A1* | 5/2023 | Ghose .................... | G06N 3/044 |
| | | | 706/15 |
| 2023/0179768 A1* | 6/2023 | Besenbruch ......... | G06N 3/0455 |
| | | | 375/240 |
| 2023/0388501 A1* | 11/2023 | Besenbruch ......... | G06N 3/0495 |
| 2024/0013384 A1* | 1/2024 | Barinov ................ | G06T 7/0012 |
| 2024/0022698 A1* | 1/2024 | Wong ................... | H04N 13/106 |
| 2024/0148367 A1* | 5/2024 | Samangouei ........ | A61B 8/5269 |

OTHER PUBLICATIONS

Prajwal, KR et al., "A lip sync expert is all you need for speech to lip generation in the wild," In Proceedings of the 28th ACM International Conference on Multimedia, Oct. 12, 2020, pp. 484-492.

"Best AI Video Generator in 2024—Synthesia," [online] Synthesia Limited © 2024 [retrieved Jan. 25, 2024], retrieved from the Internet: <https://www.synthesia.io/>, 9 pg.

* cited by examiner

112

200

204

206

Generative
AI Model
106

400

Identify a region of interest (ROI) with source data, the source data
defining a source object
402

Generate a distorted ground truth by distorting the source object, the
distorting performed using a distortion function that expands the
ROI with the source object relative to other regions within the
source object
404

Train a generative AI model to generate synthetic data defining a
distorted object, the generative AI model learning to generate the
distorted object against the distorted ground truth, as distorted by
the distortion function
406

FIG. 4

500

Distort, with a distortion function, a region of interest (ROI) within an input of inferential data, the distorting generating distortion data within which the ROI is enhanced relative to other regions of the distortion data
502

Generate, by a generative artificial intelligence (AI) model, synthetic data in response to input of the distortion data to the generative AI model, the generative AI model trained against a distorted ground truth generated using the distortion function to distort one or more ROI within source data used to guide the generative AI model in generating the synthetic data.
504

LEVERAGING DATA DISTORTION FOR SYNTHESIZING HIGH-RESOLUTION DATA

CROSS-REFERENCE TO RELATED APPLICATIONS

This application claims the benefit of U.S. Application No. 63/468,474 filed on May 23, 2023, which is fully incorporated herein by reference.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to synthetic data and, more particularly, to leveraging data distortion in generating high-resolution synthetic data.

BACKGROUND

Synthetic data may be generated using a machine-learning algorithm. The machine-learning algorithms learn patterns, correlations, and statistical properties of sample data and synthetically generate data that is statistically identical to the sample data. Thus, synthetic data has the same mathematical properties as the sample data but does not contain the same information. Synthetic data is used for a wide range of purposes. The machine-generated synthetic data typically mimics real-world data. Synthetic data is frequently used for research, testing, development, and various machine-learning tasks. For example, in training artificial intelligence (AI) models (e.g., neural networks) that require extremely large sets of diverse data, synthetic data offers a less costly, less time-intensive alternative to manually collecting and labeling real-world data. Synthetic data generation is a fast, efficient way to create datasets with thousands or even millions of objects.

SUMMARY

In one or more embodiments, a computer-based method of training a generative AI model using data distortion is disclosed. The method includes identifying a region of interest (ROI) within an input of source data. The method includes generating a distorted ground truth by distorting the source data. The distorting is performed using a distortion function that expands the ROI within the distorted ground truth relative to other regions of the distorted ground truth. The method includes training the generative AI model to generate synthetic data. The generative AI model learns to generate the synthetic data against the distorted ground truth, as distorted by the distortion function.

In one or more embodiments, a computer-based method of synthesizing high-resolution data using data distortion is disclosed. The method includes distorting, with a distortion function, an ROI within an input of inferential data. The distorting generates distortion data within which the ROI is enhanced relative to other regions of the distortion data. The method includes generating, by a generative AI model, synthetic data. The synthetic data is generated in response to input of the distortion data to the generative AI model. The generative AI model is trained against a distorted ground truth generated using the distortion function to distort one or more ROIs within source data used to guide the generative AI model in generating the synthetic data.

In one or more embodiments a system includes one or more processors configured to execute operations. The operations include distorting, with a distortion function, an ROI within an input of inferential data. The distorting generates distortion data within which the ROI is enhanced relative to other regions of the distortion data. The operations include generating, by a generative AI model, synthetic data. The synthetic data is generated in response to input of the distortion data to the generative AI model. The generative AI model is trained against a distorted ground truth generated using the distortion function to distort one or more ROIs within source data used to guide the generative AI model in generating the synthetic data.

In one or more embodiments, a computer program product includes a computer readable storage medium having program instructions stored thereon. The program instructions are executable by a processor to perform the various operations described within this disclosure.

This Summary section is provided merely to introduce certain concepts and not to identify any key or essential features of the claimed subject matter. Many other features and embodiments of the disclosed technology will be apparent from the accompanying drawings and from the following detailed description.

BRIEF DESCRIPTION OF THE DRAWINGS

The accompanying drawings show one or more embodiments; however, the accompanying drawings should not be taken to limit the disclosed technology to only the embodiments shown. Various aspects and advantages will become apparent upon review of the following detailed description and upon reference to the drawings. The patent or application file contains at least one drawing executed in color. Copies of this patent or patent application publication with color drawing(s) will be provided by the Office upon request and payment of the necessary fee.

FIG. 4 is an example method illustrating certain operative features of the DBDG framework of FIG. 1.

FIG. 5 is another example method illustrating certain operative features of the DBDG framework of FIG. 1.

DETAILED DESCRIPTION

Figure 1A:
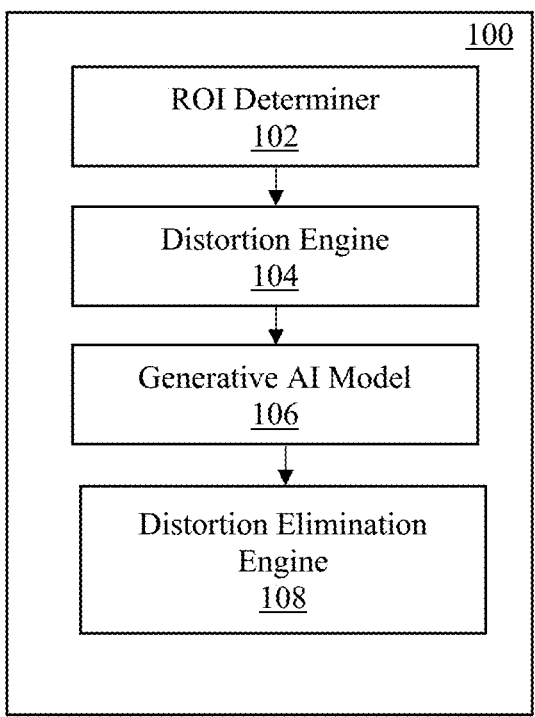
FIGS. 1A-1C, collectively referred to as FIG. 1, illustrate an example architecture and certain operative aspects of a distortion-based data generating (DBDG) framework.

While the disclosure concludes with claims defining novel features, it is believed that the various features described herein will be better understood from consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to synthetic data and, more particularly, to leveraging data distortion in generating high-resolution synthetic data. Generation of high-resolution data is important in a variety of contexts, such as social media, the metaverse, and generative AI. Generative AI is increasingly used to synthesize data in generating images, video, and audio. For example, a variational autoencoder (VAE) may sample latent points from a latent space of source image features and, either deliberately or randomly, map latent points to an image space, generating previously unseen images, which can be sequentially rendered as a video. A generative adversarial network (GAN), using a generator network generates synthetic images by decoding a random point in latent space. Using a discriminator network (or adversary), the GAN predicts whether an image input (real or synthetic) came from a training set or was created by the generator network. The generator is trained to fool the discriminator network, generating increasingly realistic images as training goes on.

Even with modern hardware and increasingly sophisticated generative AI algorithms, however, generating high-resolution data remains a challenge. The challenge with respect to generating synthetic data, to a large measure, stems from the fact that source data (e.g., images, audio, video) that provides the control parameters, or "guides," a generative AI model in generating data is often characterized by uneven distribution of data elements (e.g., pixels, frames, audio segments). If some data elements are overrepresented while others are underrepresented, the result may be over-fitting and/or the learning of spurious correlations by the model.

For example, in rendering images of a digital human, the mouth region of a source image of a human is typically much smaller than other facial features. The predominance of other facial features over those of the mouth impedes the generative AI model's learning crucial aspects of the mouth from the source image. There are too few mouth features (e.g., pixels) and those that are available are dominated by other features (e.g., hair, skin, clothing, background) that cover a greater portion of the image. Accordingly, too much of the machine learning relates to other facial, body, clothing, and/or background features (depending on the nature of the source image) and too little relates to the mouth.

The under-learning of the mouth may give rise to anomalous artifacts and renders features of the mouth less clearly. Whenever the model is required to generate a high-resolution image that includes many features (e.g., skin texture, hair, eyes), less learning is devoted to smaller objects (e.g., teeth, lips). This is especially problematic given that in many applications the digital human may appear as a life-sized image rendered on a large screen (e.g., a hotel or airport kiosk). In such instances, it is vital that the mouth of the digital human be rendered with a very high-resolution, especially if mouth movements are synchronized with audio rendered by the digital human engaged in conversation.

In accordance with the inventive arrangements disclosed herein, methods, systems and computer program products are provided that are capable of generating high-resolution objects (e.g., images, video, audio) by distorting the source data that serves to guide the generation of synthetic data by a generative AI model. In certain aspects, one or more regions of interest (ROIs) of the source data are distorted to enhance each ROI relative to other portions of the source data, thus generating a distorted ground truth in which each ROI is enhanced or enlarged. The distorted ground truth is input to the generative AI model (e.g., GAN), which learns to generate a high-resolution, distorted object against the distorted ground truth. An "object" is composed of machine-generated synthetic data. The synthetic data defines the object. The object, for example, may be an image, video, or audio composed of machine-generated synthetic data such as pixels, video frames, audio segments, and the like. As used herein in reference to a generative AI model, the phrase "generated against" means that the generative AI model generates the distorted object by iteratively adjusting the model parameters until the model can generate the distorted object with sufficient similarity to the distorted ground truth.

In certain embodiments, the inventive arrangements generate the distorted ground truth by distorting the source data using a distortion function. The distortion function enhances an ROI within the source data relative to other regions within the source data. For example, if the source data is an image, the distortion function enlarges an ROI of the image by reconfiguring and augmenting the pixels corresponding to the ROI, thereby expanding the ROI relative to other regions of the image.

A general technical effect of the inventive arrangement's distortion is to enhance the source data that pertains to the ROI such that the ROI of an AI-generated object has higher resolution than it would otherwise if generated with conventional technologies. Ordinarily, if the ROI of the source data is sparse, then the model almost invariably will fail to generate an object in which the ROI has sufficient resolution using conventional technology. The reason is that the model pays relatively less attention to sparse data relative to other, more prevalent data. The distortion engendered by the inventive arrangements overcomes this limitation by enhancing the data representing the ROI such that the generative AI model pays greater attention to the ROI than it otherwise would with conventional techniques.

For example, in generating a digital human, the mouth of a source image is an ROI that likely moves with greatest frequency and in a varied manner. The mouth is likely represented by sparse data, which means the model likely fails to render the lips, teeth, and mouth with sufficient resolution. As a result, if animated, the digital human will not appear to speak like a real human. To incorporate the motion and have the generative AI model assign higher importance to the ROI, the inventive arrangements distort the image by reconfiguring and augmenting the pixels corresponding to regions with high variance, while reducing the number of pixels of the lower variance regions. Thus, the distortion induced by the inventive arrangements creates an image in which the ROI covers a larger number of pixels compared to the original source data (human image), enabling the generative AI model to generate a digital human in which the ROI (mouth) is rendered with greater resolution.

More generally, the inventive arrangements disclosed herein are thus able to generate high-resolution synthetic data defining objects such as images, video, and audio. In addition to generating synthetic data defining such objects with greater overall resolution—especially with respect to regions represented by sparse data—the inventive arrangements also do so without any additional burden on computing resources. Specifically, rather than allocating extra memory for storing greater amounts of data pertaining to the ROI-related parameters, the inventive arrangements reconfigure the image by leveraging distortion so that a fixed amount of memory is reallocated to the enhanced data of the ROI(s). The allocated memory is taken from the non-sparse data without increasing the overall amount of memory needed for rendering objects with greater resolution. Accordingly, this is another technical effect of the inventive arrangements.

A distorted object generated against a distorted ground truth, in certain arrangements, may be generated as input to a machine-learning model, such as a deep learning neural network, trained to generate a prediction (e.g., classification, regression). The greater resolution of the distorted object enhances the likelihood of the classifier model's rendering an accurate prediction pertaining to the input. In other arrangements, multiple high-resolution objects may be generated using the inventive arrangements, the objects being generated for training a machine-learning model. The generation is less costly and less time-intensive than manually collecting and labeling real-world data and provides the benefit of having high resolution. Synthetic data generation is a fast, efficient way to create datasets with thousands or even millions of high-resolution objects.

In other arrangements, the inventive arrangements generate undistorted objects having high resolution. The inventive arrangements generate a high-resolution undistorted object by reversing the distortion of a corresponding distorted object, which has been generated against a distorted ground truth. The distortion is reversed using an inverse distortion function. The undistorted object may be, for example, a high-resolution image, video, audio, or the like.

In certain embodiments, the inventive arrangements generate high-resolution animation by generating multiple high-resolution, undistorted images. The undistorted images are generated from distorted images generated against a distorted ground truth and are sequentially rendered to create video animation, such as animation of digital human.

In other embodiments, the inventive arrangements are used to distort source data comprising audio. The audio may include one or more ROIs, which the inventive arrangements enhance by distorting segments of the audio corresponding to the ROI(s). The distortion enables a machine-learning model (e.g., neural network) to perform a prediction or recognition task pertaining to the audio more accurately.

In still other embodiments, the inventive arrangements encrypt source data by distorting one or more ROIs within the source data. Using an inverse distortion function to eliminate the distortion after conveying the distorted data over a communication network operates to decrypt the source data.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

Figure 1B:
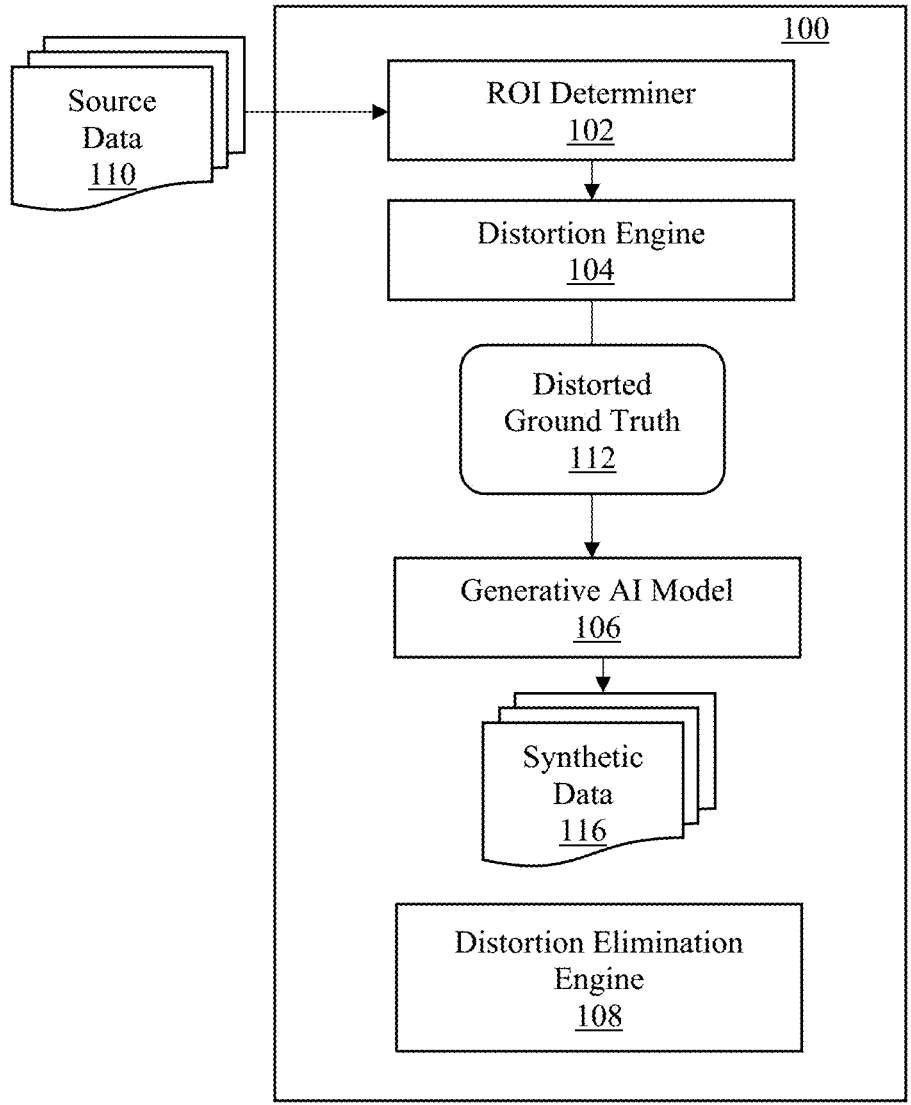
Figure 1C:
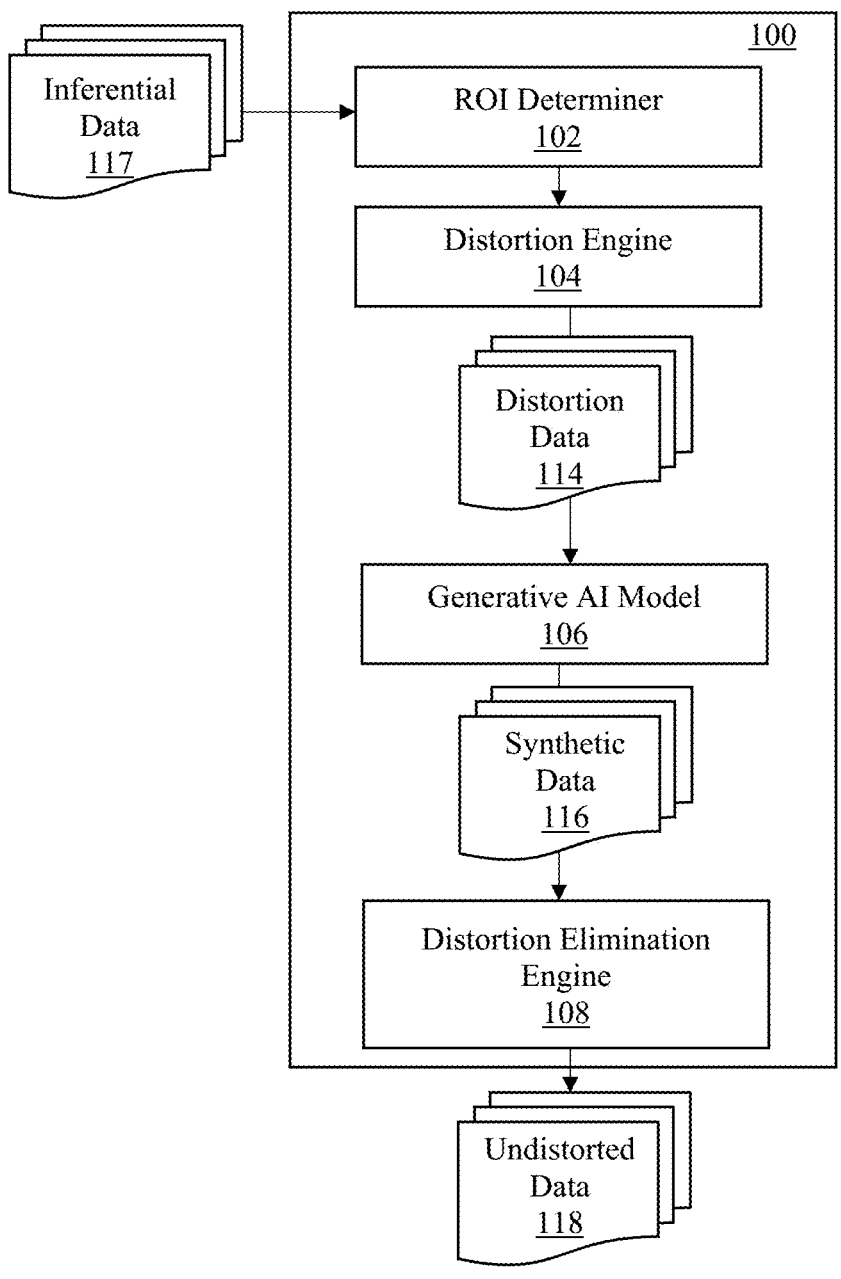

FIGS. 1A-1C illustrate an example architecture and certain operative aspects of a distortion-based data generating (DBDG) framework 100, according to certain embodiments. In FIG. 1A, the example architecture of DBDG framework 100 illustratively includes ROI determiner 102, distortion engine 104, generative AI model 106, and distortion elimination engine 108. The various components of DBDG framework 100, in one or more embodiments, may be implemented as computer-executable code, or software, that is executable by a data processing system such as data processing system 1000 described herein with respect to FIG. 10.

FIG. 1B illustrates certain operative aspects of DBDG framework 100 performed during a training phase. During training, distortion engine 104 distorts source data 110. Source data 110, in various arrangements, may include only images, only audio, a combination of images and audio, or video frames, as well as other types of data. Distortion engine 104 distorts source data 110 by expanding or enlarging one or more ROIs within the data, thereby generating distorted ground truth 112. Generative AI model 106, as described herein, is trained against distorted ground truth 112 using various types of data (e.g., distorted contour images) during training to generate synthetic data 116. Synthetic data, 116, as described below, may be conveyed to distortion elimination engine 108 during a run-time inference to eliminate distortion of the data.

FIG. 1C illustrates certain operative aspects of DBDG framework 100 performed during an inference phase once generative AI model 106 is trained. During a run-time inference, generative AI model 106 generates synthetic data 116 in response to the input of inferential data 117. In certain arrangements, synthetic data 116—which is generated to have high resolution—is distorted data (e.g., distorted image) that undergoes distortion elimination to generate undistorted data 118.

ROI determiner 102 identifies an ROI within source data 110. Source data 110, in various arrangements, defines a source object such as an image, audio, video, or the like. Accordingly, if for example the source object is an image, then source data 110 may comprise the pixels of the image, and thus ROI determiner 102 identifies the pixels comprising the ROI. In certain embodiments, the ROI within source data 110 is annotated (e.g., enclosed within a bounding box) prior to input to DBDG framework 100.

Distortion engine 104 generates distorted ground truth 112 by distorting source data 110. The distortion is performed by a distortion function implemented by distortion engine 104. Distortion engine 104, in various embodiments, may implement any of several different distortion functions. The distortion function may be a continuous function. For example, the distortion function may be a continuous, monotonically non-decreasing function.

Operatively, using the distortion function, distortion engine 104 generates distorted ground truth 112 by enhancing or expanding the ROI within the source data 110. For example, if the source data 110 is an image, then distortion engine 104 generates distorted ground truth 112 using the distortion function to reconfigure and augment the image pixels corresponding to the ROI. The distortion function uses the ROI pixels as parameters and reconfigures the pixels by over-indexing (stretching the image leftward from approximate center of the ROI) and under-indexing (stretching the image rightward from approximate center of the ROI) the pixels. In other embodiments, the distortion function may over-index by stretching pixels above approximate center of the ROI upward and/or under-index by stretching pixels below approximate center of the ROI downward. In still other embodiments, the distortion function may over-index in each of the up, down, left, and right directions. The distortion function thus enlarges or enhances the ROI. For example, if the ROI occupies five (5) percent of an image, then distortion engine 104 may distort the image such that the ROI expands to ten (10) or fifteen (15) percent of the image. The image size is held constant, and regions over which the ROI is stretched are filled in with pixels corresponding to the ROI. Augmenting the enlarged ROI with newly added pixels that replace those in regions over which the ROI is stretched, in certain embodiments, is performed by interpolation.

As an illustrative, non-limiting example of a distortion function, the distortion function is a spline (e.g., a reversible, forward spline). A spline is a mathematical function defined by piecewise polynomials capable of creating a smooth curve connecting irregular data points (e.g., pixel coordinates). The spline, for example, is capable of creating a quadrilateral distortion that maps corners of the ROI to new coordinates and then maps other pixels in proportion to the newly shaped quadrilateral. The mappings relocate the ROI pixels to expand the ROI and fill-in the expanded portions with pixels corresponding to the ROI. As another illustrative, non-limiting example, the distortion function performs a radial expansion from an approximate center of the ROI. Radially expanding the ROI out from an approximate center of the ROI stretches pixels over the ROI center upwards, pixels to the left and right of the ROI center leftward and rightward, respectively, and pixels below the ROI center downward. In other embodiments, different distortion functions may be implemented by distortion engine 104. For example, another distortion function implemented by distortion engine 104 may be a polynomial fitted by distortion engine 104's estimating the ROI.

Generative AI model 106, through machine learning, learns to generate synthetic data 116 against distorted ground truth 112. The ROI of ground truth 112 is enhanced or enlarged, and accordingly, provides enhanced information in training generative AI model 106. The greater information enables generative AI model 106 to generate synthetic data 116 that, with respect to the ROI, has higher resolution than the data would otherwise have if the data were generated using conventional technology. Synthetic data 116, as generated by AI model 106, has the ROI that corresponds to the ROI of distorted ground truth 112 against which the model is trained. Accordingly, the ROI of synthetic data 116 as generated is characterized as having high resolution. The high resolution of synthetic data 116 means the data can be used for various purposes such as providing input to a neural network model for prediction (e.g., classification, regression). The high resolution, for example, makes it more likely that synthetic data will be correctly classified by a neural network classifier. In other embodiments, such as generating high-resolution images, for example, synthetic data 116 undergoes further processing by DBDG framework 100 as described below.

Referring additionally now to FIGS. 2A-2D, certain operative aspects of DBDG framework 100 are illustrated. The operative aspects pertain to generating synthetic data 116 comprising an image. ROI determiner 102 identifies ROI 200 within source data 110 comprising image 202. ROI 200 is illustratively annotated by a bounding box in FIG. 2A. Distortion engine 104 generates distorted ground truth 112 using a distortion function, which enlarges ROI 200. ROI 200 of distorted ground truth 112 is larger relative to other regions of the image, which are now made smaller by the distortion generated by distortion engine 104. Enlarging ROI 200 augments the number of pixels of the now-enlarged region and concomitantly reduces the number in the other regions. As described above, the enlarged ROI 200 may be populated with pixels generated through interpolation and corresponding to the enlarged region.

Figure 2A:
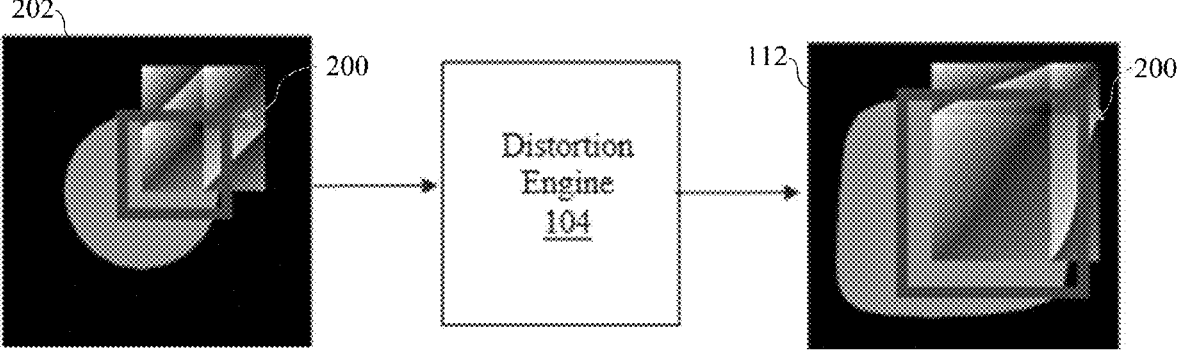
FIGS. 2A-2D illustrate operative aspects, according to certain embodiments, of the DBDG framework of FIG. 1.
Figure 2B:
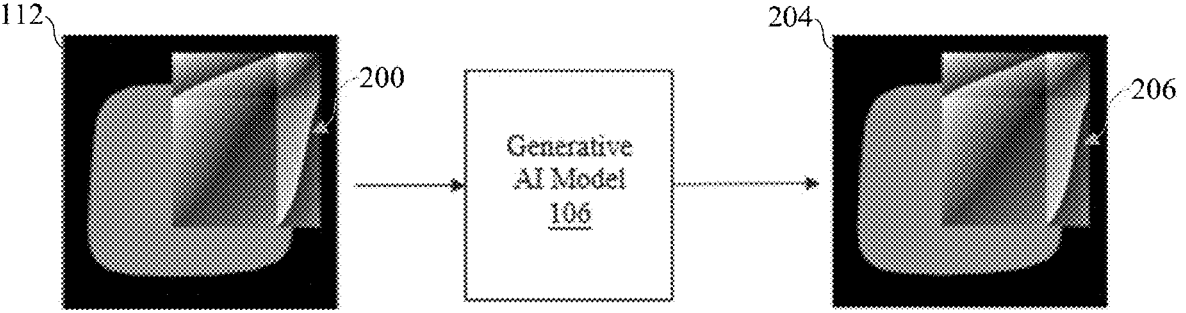

Generative AI model 106 learns to generate synthetic data (e.g., image pixels) against distorted ground truth 112, as illustrated in FIG. 2B. The augmentation of the number of pixels of ROI 200 ensures that more of generative AI model 106's learning is directed to ROI 200 and relatively less to other regions. Accordingly, generative AI model learns to generate synthetic data 116 comprising image 204 in which ROI 206 corresponds to ROI 200 of distorted ground truth 112 and is characterized as having a high resolution. The higher resolution means that if synthetic data 116 comprising image 204 is fed into a classifier (e.g., neural network), then the classifier is more likely to classify the image accurately. Generative AI model 106, in other arrangements, can additionally or alternatively generate synthetic data (other distorted objects) for training other machine learning models, which given the higher resolution of the data used for training makes the model being trained more likely to render more accurate predictions (e.g., classifications, regressions).

Figure 2C:
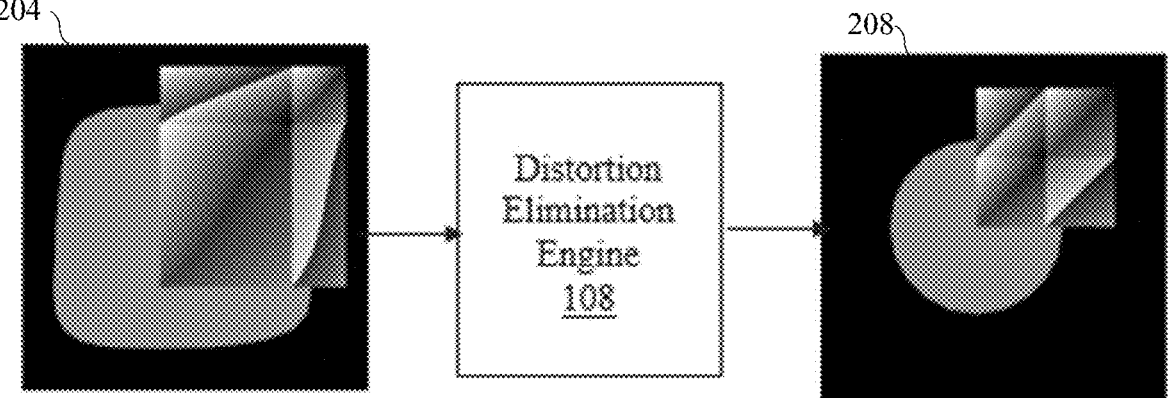
Figure 2D:
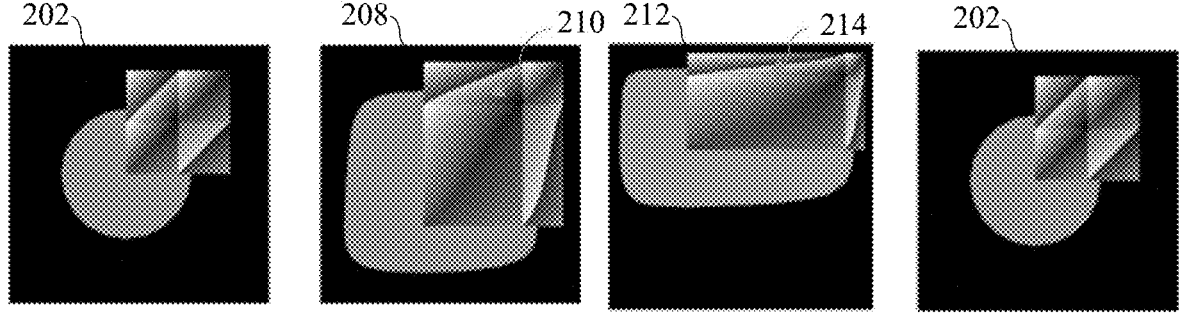

As illustrated in FIG. 2C, synthetic data 116 comprising image 204 can be fed to distortion elimination engine 108. Distortion elimination engine 108 implements an inverse distortion function. The inverse distortion function implemented by distortion elimination engine 108 reverses the distortion engendered by the distortion function implemented by distortion engine 104. Certain distortion functions implemented by distortion engine 104 are inherently reversible functions, such as a spline. Others, however, are not. Accordingly, in certain embodiments, in response to determining that the distortion function is non-reversible, distortion elimination engine 108 fits a polynomial (e.g., cubic polynomial) to sampled points of synthetic data 116. Using the inverse distortion function, distortion elimination engine 108 generates undistorted data 118, which in FIG. 2C comprises image 208. Undistorted data 118 comprising image 208 is an undistorted version of synthetic data 116 comprising image 204. Thus, if synthetic data 116 is an image, then the pixels of the ROI in undistorted data 118 revert to a number that removes the distortion, resulting in an undistorted image.

The operations of DBDG framework 100, in certain embodiments, are fully reversible. Accordingly, distortion engine 104 may implement the distortion function multiple times to distort multiple ROIs within source data 110. Distortion engine 104 thus highlights multiple, different regions as ROIs. Illustratively, in FIG. 2D, image 202 is distorted by a first application of the distortion function resulting in image 208 in which ROI 210 is enlarged. A second application of the distortion function generates image 212 in which different ROI 214 is enlarged. With each application, distortion function may be applied to the center of a different ROI within the image and with different strength. Image 202 is recovered by applying inverse distortion functions to the different distorted images, the inverse distortion functions may be applied in the reverse sequence in which each was applied to image 202.

Figure 3B:
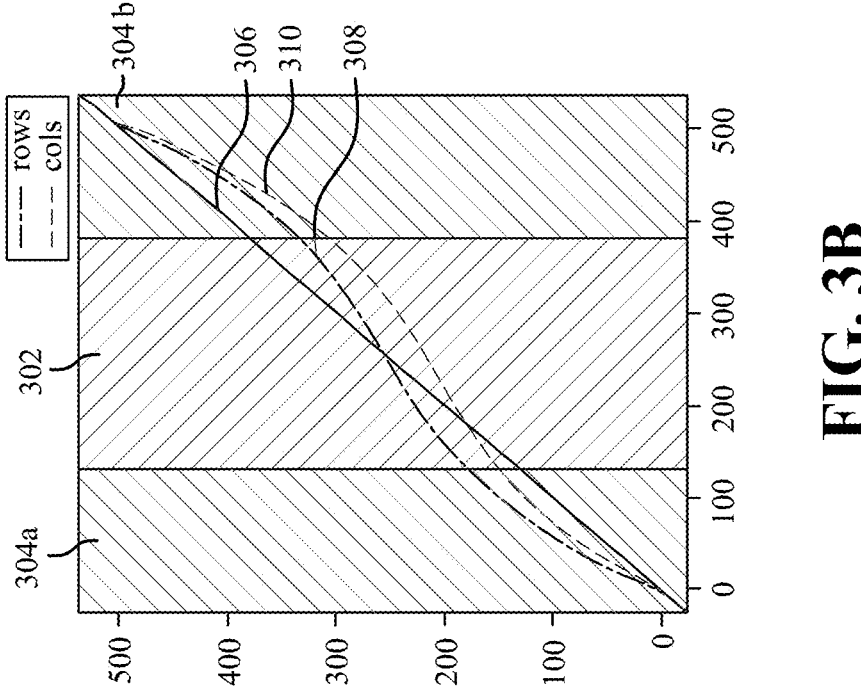
FIGS. 3A and 3B illustrate other operative aspects, according to certain embodiments, of the DBDG framework of FIG. 1.
Figure 3A:
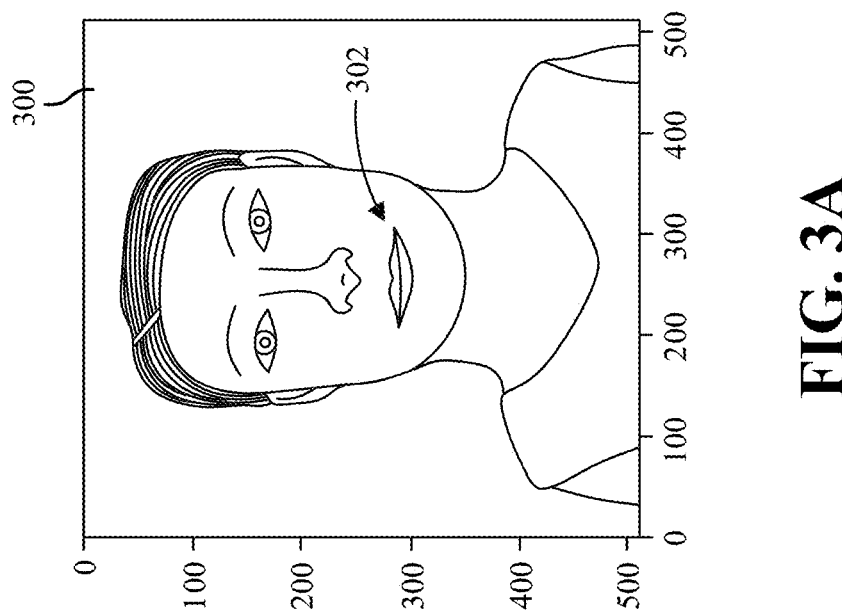

FIGS. 3A and 3B illustrate certain operative aspects of DBDG framework 100 in which source data is an image of a human face, and distorted ground truth 112 is distorted image 300. ROI 302 of distorted image 300, as illustrated in FIG. 3A, is the mouth of the face. As shown, the mouth (ROI 302) is enlarged relative to other portions of distorted image 300. FIG. 3B graphically displays the results of calculations associated with the distortion generated by distortion engine 104. Regions 304a and 304b correspond to the now-shrunken portions of the background in distorted ground truth 112 comprising distorted image 300, while ROI 302 corresponds to the now-enlarged mouth of the image. Straight line 306 graphically represents the undistorted row and column indices of source data 110's pixel coordinates prior to their reconfiguration by distortion engine 104. Cubic polynomial 308 is non-linear and corresponds to the reconfiguration of the row indices of distorted ground truth 112, and non-linear cubic polynomial 310 corresponds to the reconfiguration of the column indices. The slopes (first derivatives) of cubic polynomials 308 and 310 are less than one within ROI 302 corresponding to ROI 302, as augmented in distorted ground truth 112, while in both regions 304a and 304b the slopes are greater than one. The cubic polynomial slopes are less than one, indicating a zooming in on the mouth of distorted image 300, thereby enlarging the mouth region relative to other regions of the image. The slopes greater than one indicate zooming out or shrinking of corresponding regions 304a and 304b relative to ROI 302.

FIG. 4 is an example method 400 illustrating certain operative features of DBDG framework 100 in accordance with some of the inventive arrangements disclosed herein. Method 400 pertains to DBDG framework 100's leveraging data distortion to train a generative AI model.

In block 402, ROI determiner 102 identifies an ROI within source data 110. Source data 110 may define a source object, such as an image and accordingly may comprise image pixels. For example, the source object may be a control image that guides generative AI model 106's generation of an image, such as a digital human.

In block 404, distortion engine 104 generates distorted ground truth 112. Distorted ground truth 112 is generated by distorting the source object defined by source data 110. Distortion engine 104 distorts the source object by expanding the ROI identified by ROI determiner 102 using a distortion function implemented by distortion engine 104. The distortion enhances the ROI relative to other regions within the source object. For example, if the source object is an image, the distortion performed with the distortion function distends the ROI by reconfiguring and augmenting pixels corresponding to the ROI. The enhanced ROI provides higher resolution and more information for training generative AI model 106, while maintaining the quality of the ROI.

In block 406, generative AI model 106 learns to generate synthetic data, which defines synthetic data 116. Generative AI model 106 learns to generate synthetic data 116 against distorted ground truth 112. For example, synthetic data 116 may be a distorted image in which an ROI corresponding to the ROI of distorted ground truth 112 is expanded relative to other regions of the distorted image. Generative AI model 106 learns from generating images in response to input of training data and iteratively compares the generated images to distorted ground truth 112 until the model is able to generate synthetic data 116 that is sufficiently close to distorted ground truth 112 against which the model is trained.

FIG. 5 is an example method 500 illustrating certain operative features of DBDG framework 100 in accordance with some of the inventive arrangements disclosed herein. Method 500 pertains to leveraging data distortion to synthesize high-resolution data using a generative AI model 106 trained as described in FIG. 4.

In block 502, during inference, which may be performed in real-time, distortion engine 104 distorts an ROI within an input of inferential data 117. The distorting is performed by distortion engine 104 implementing the distortion function, which generates distortion data 114 within which the ROI is enhanced relative to other regions of the distortion data. Distortion data 114 comprises the same type data that is used to train generative AI model 106. For example, in generating synthetic data 116 comprising an image, distortion data 114 may comprise a distorted contour image. The distorted contour image is generated by distorting the landmarks of an undistorted contour image (e.g., contour image of a human face). In other arrangements, distortion data 114 may comprise a distorted contour image in which the ROI (e.g., mouth of the human) is removed. Distortion data 114 is supplemented, in this example, by undistorted audio data, which generative AI model 106 uses to generate the ROI of the machine-generated image.

In block 504, generative AI model 106 generates synthetic data 116. Synthetic data 116 is generated by generative AI model 106 in response to input of distortion data 114 to the model. Generative AI model 106 generates synthetic data 116 having been trained against distorted ground truth 112, which is generated using the distortion function to distort one or more regions of interest (ROI) within source data used to guide generative AI model 106 in generating synthetic data 116.

Synthetic data 116 is distorted so that the data is characterized by the high resolution of one or more ROIs. In some arrangements, synthetic data 116 undergoes elimination of the distortion. The distortion elimination is performed by distortion elimination engine 108, which generates undistorted data 118. Distortion elimination engine 108 eliminates distortion by implementing an inverse distortion function, which reverses the distortion of the distortion function. For example, undistorted data 118 may be an image generated from a distorted image in which each of one or more ROIs are enlarged for enhanced resolution by reconfiguring and augmenting the pixels corresponding to each ROI. Undistorted data 118 is an undistorted image generated by a reversion of the reconfigured and augmented pixels. Thus, each ROI of the resulting image is no longer distended or enlarged relative to the image's other regions. Each ROI, however, is clearer and/or less distorted (as would be the case with conventional technology) given that generative AI model 106 had the advantage of enhanced information-obtained from the distortion that enlarged each ROI—in learning to generate synthetic data 116 from which undistorted data 118 is derived.

In one application, once generative AI model 106 is trained, DBDG framework 100 may be used for creating video animations during run-time inference. Source data 110 may be an image, which serves as a guide for generative AI model 106 generating synthetic data defining synthetic data 116 which is also an image. Generative AI model 106 may generate a plurality of distorted images, and distortion elimination engine 108 may reverse the distortion of each, thereby generating multiple undistorted images. The undistorted images may be sequentially rendered to generate a video animation.

In some embodiments, the image defined by source data 110 is a control image of a human that serves to guide generative AI model 106 in generating a digital human having features that, though distinct, are similar to the image of the human. Generative AI model learns against distorted ground truth 112, which is a distortion of the control image in that one or more ROIs are enhanced.

Pixelwise, with respect to the control image, the mouth includes relatively small objects such as the lips and partially exposed portions of the teeth seen when the lips are parted. Additionally, the pixels of the region of the mouth exhibit high variability whenever the digital human is rendered speaking or engaging with a user in conversation. The small number of pixels means that with conventional AI rendering the generative AI model has available less data for generating the mouth and corresponding movements as compared with rendering other aspects of the image such as hair, skin, clothing, and the like. Moreover, the ROI pixels associated with the mouth exhibit a relatively higher degree of variance because the pixels' values change with high frequency given the movement of the mouth and lips when the digital human is speaking.

Generative AI model 106 gains greater information for more accurate rendering of the digital human by learning against distorted ground truth 112 in which the mouth is an enhanced ROI. Distortion data, distorted by the distortion function, is used in training generative AI model 106. In certain embodiments, the distortion data may comprise a distorted contour image guided by landmarks of the control image. The landmarks are distorted by applying the distortion function, and the landmarks—as distorted—are used to create the distorted contour image. Once trained, generative AI model 106 may generate multiple distorted images based on the distorted contour image and its key points.

In other embodiments, the distortion data used in training generative AI model 106 is multimodal data. The multimodal data, in certain embodiments, includes the mouth region is extracted from the contour image, and an audio of the digital human is utilized to drive the mouth region in the generated distorted images.

Distortion elimination engine 108, using an inverse distortion function, may generate multiple frames of an undistorted digital human by eliminating the distortion from the distorted images. Video animation of the digital human is created by sequentially rendering the multiple frames.

In one or more embodiments, the digital human may be endowed with AI capabilities for interpreting user input and responding to the user input in a contextually appropriate manner. The digital human can interact with a user using verbal and/or non-verbal cues. Implementing natural language processing (NLP), a chatbot, and/or other software, the digital human can be configured to provide human-like interactions with the individual and/or perform activities such as scheduling, initiating, terminating, and/or monitoring of the operations of various systems and devices.

Accordingly, the digital human may be rendered within various virtual computing environments, such as a metaverse. The digital human may be generated with speech capabilities as a virtual news anchor, presenter, greeter, receptionist, coach, and/or influencer, for example. The digital human may be configured to operate as a virtual assistant that is pre-programmed to assist a user seeking one or more types of information.

Figure 6:
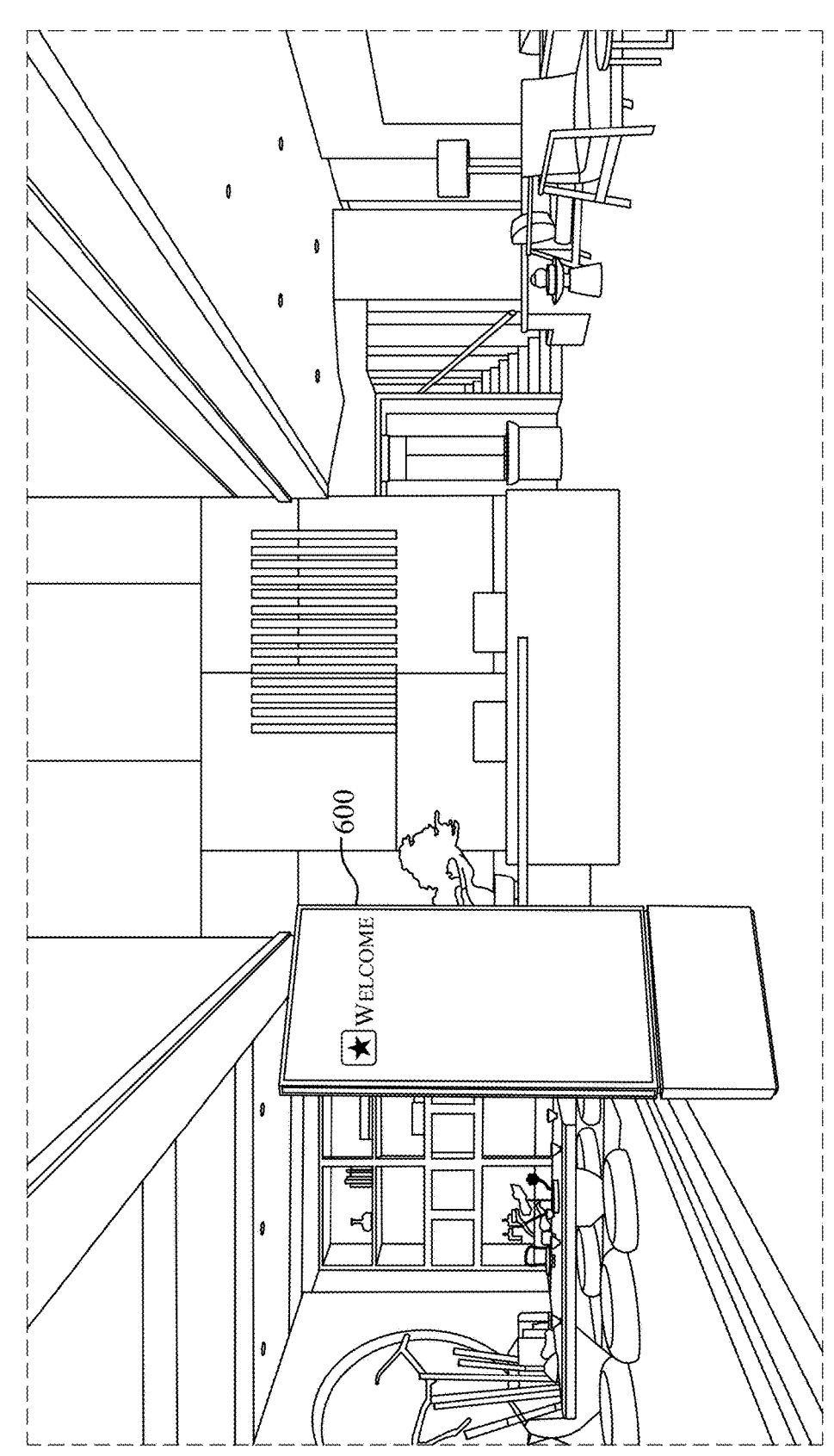
FIG. 6 illustrates an example kiosk device with which a user may interact with a digital human created using the DBDG framework of FIG. 1.
Figure 7:
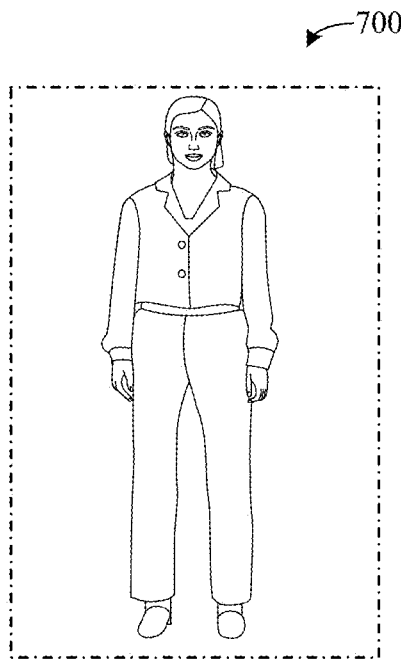
FIG. 7 illustrates an example digital human generated with images created by the DBDG framework of FIG. 1.

FIG. 6 illustrates an example device 600 implemented as a kiosk situated in a lobby 602 and having a screen, microphone, and display for rendering video and audio to a user in response to input from the user. FIG. 7 illustrates, digital human animation 700 which may be rendered on device 600 as a life-sized figure capable of interacting with user.

In other examples, the digital human may operate as an artificial intelligence chat bot and/or visual component of a virtual assistant. Adding a visual component in the form of a digital human to an automated or AI-enabled chat bot may provide a human-like dimension to machine-human interactions. The digital human may be used as a visual component displayed in a display device coupled to or paired with a smart-speaker virtual assistant to make interactions more human-like. In one or more examples the digital human as a chat assistant may not only message (e.g., send text messages) into a chat with a user, but also have a visual human-like form that reads the answer. Based on the disclosed technology, the digital human as virtual assistant can be conditioned on both audio and head position, while keeping high quality rendering of ROIs such as the mouth, eyes, and/or hands.

Figure 8:
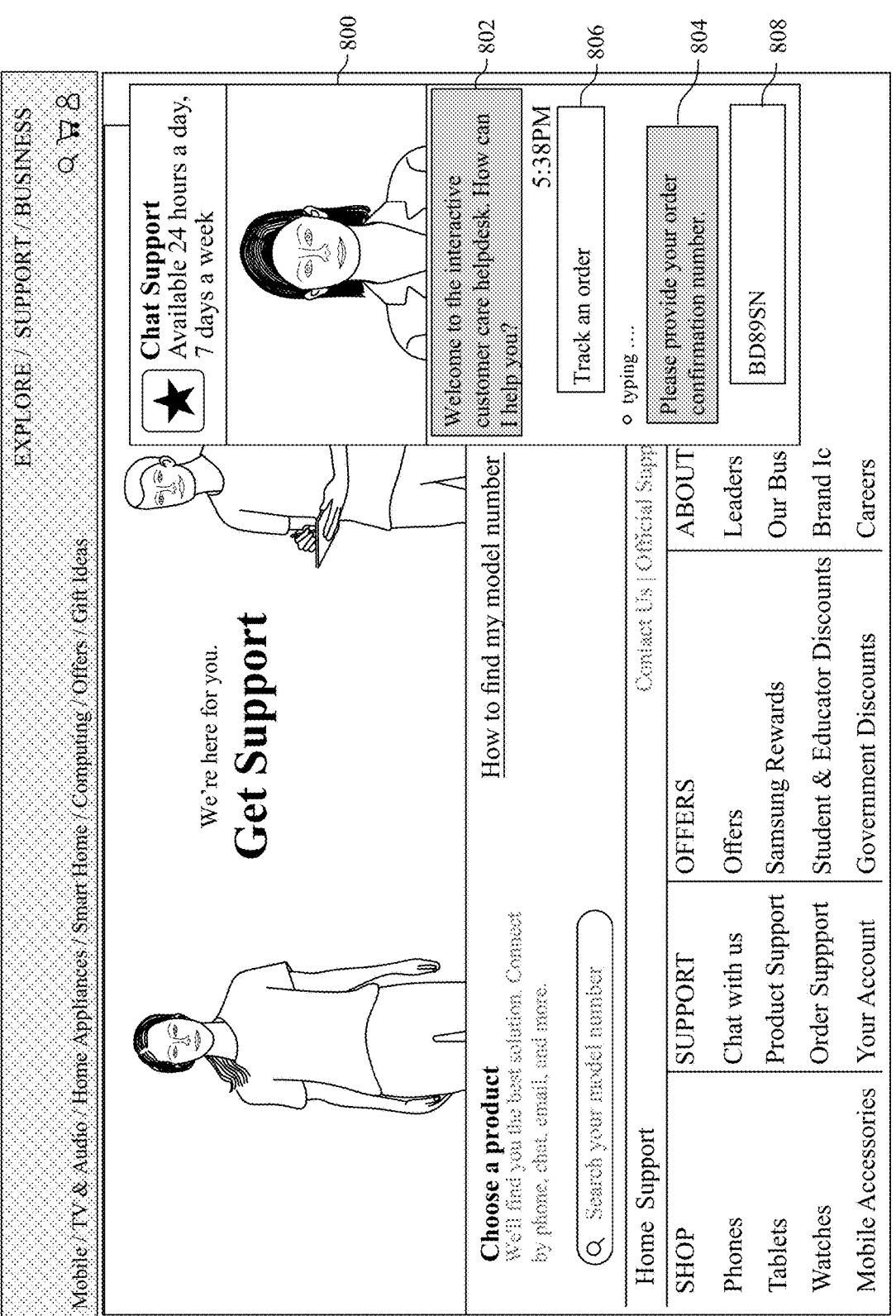
FIG. 8 illustrates an example implementation of a digital human in the context of chat support provided by the digital human generated with images created by the DBDG framework of FIG. 1.

FIG. 8 illustrates an example of the digital human as virtual chat assistant 800. Illustratively, virtual chat assistant 800 not only engages with a user by sending text messages during a chat, but also appears in human-like form reading responses to user-conveyed text messages. Generated from an image created with DBDG framework 100, virtual chat assistant 800's lip motions closely track the audio rendering of the assistant's text responses 802 and 804 to user text request 806. The user also is able to interact with virtual chat assistant 800 by way of field 808 whether by voice or typing.

Figure 9:
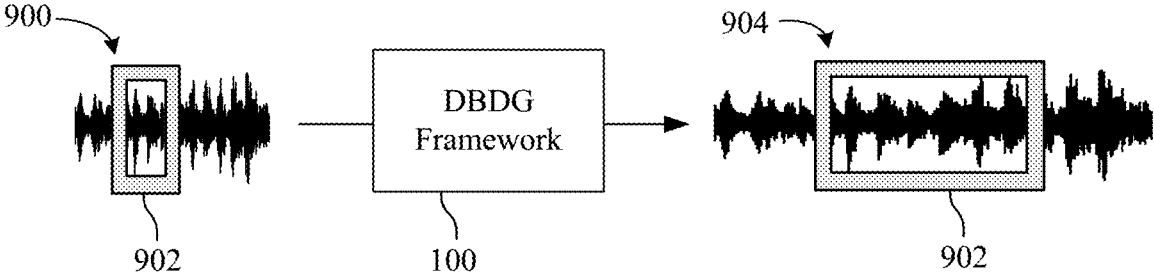
FIG. 9 illustrates an example application of the DBDG framework of FIG. 1.

FIG. 9 illustrates another example application of DBDG framework 100. In accordance with the application, DBDG framework 100 distorts source data comprising audio 900. Audio 900 illustratively includes ROI 902, a segment of the audio. Operatively, DBDG framework 100 generates distorted audio 904 by distorting the segment of the audio corresponding to ROI 902. In identifying audio features for extraction to input to a machine-learning model, the distorting provides a larger resolution of ROI 902 of audio 900 and is analogous to stretching audio 900 in time. For example, ROI 902 may be stretched by including additional samples therein through interpolation where interpolated samples are inserted between the original samples of ROI 902. The distortion created by DBDG framework 100 slows down the segment of the audio corresponding to the ROI 902. Other portions may be sped up so that the time span of the audio segment remains constant. In the other portions, samples may be removed. The number of samples included in audio 900 remains constant. The number of samples per unit time also remains constant. Thus, ROI 902 expands over other portions of audio 900. Less emphasis is given to those portions and greater emphasis to ROI 902. The distortion, which enhances ROI 902, enables a machine-learning model (e.g., neural network) to process timesteps more accurately. Thus, the machine-learning model is able to perform recognition or prediction tasks on audio 900 more accurately.

Another application of DBDG framework 100 is encryption. In certain embodiments, DBDG framework 100 encrypts source data by distorting one or more ROIs within the source data. With the source data encrypted, the data can be conveyed for example over a data communication network. DBDG framework 100 decrypts the source data using an inverse distortion function. The inverse distortion function eliminates the distortion to decrypt the source data after the data has been conveyed the communication network.

Figure 10:
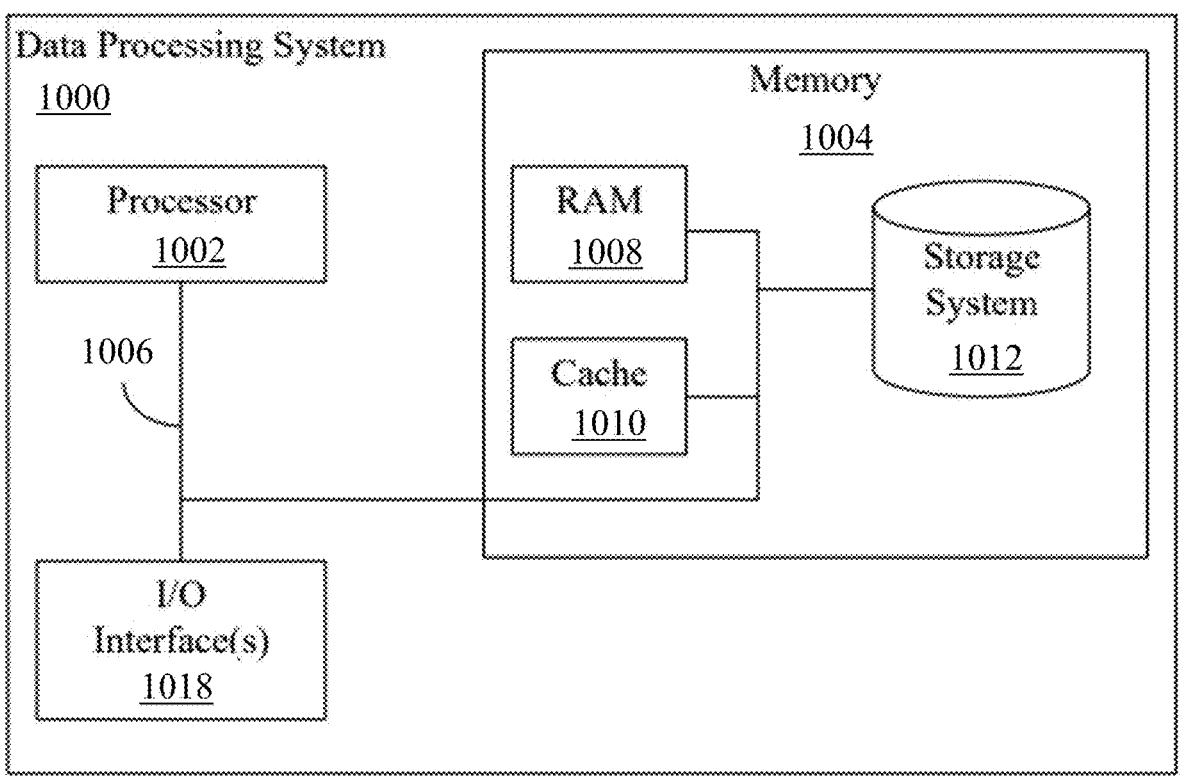
FIG. 10 illustrates an example implementation of a data processing system for use with the DBDG framework described within this disclosure.

FIG. 10 illustrates an example hardware architecture of a data processing system 1000. As defined herein, the term "data processing system" means one or more hardware systems configured to process data, each hardware system including at least one processor and memory, wherein the processor is programmed with computer-readable instructions that, upon execution, initiate operations. Data processing system 1000 can include a processor 1002, a memory 1004, and a bus 1006 that couples various system components including memory 1004 to processor 1002.

Processor 1002 may be implemented as one or more processors. In an example, processor 1002 is implemented as a central processing unit (CPU). Processor 1002 may be implemented as one or more circuits capable of carrying out instructions contained in program code. The circuit may be an integrated circuit or embedded in an integrated circuit. Processor 1002 may be implemented using a complex instruction set computer architecture (CISC), a reduced instruction set computer architecture (RISC), a vector processing architecture, or other known architectures. Example processors include, but are not limited to, processors having a x86 type of architecture (IA-32, IA-64, etc.), Power Architecture, ARM processors, and the like.

Bus 1006 represents one or more of any of a variety of communication bus structures. By way of example, and not limitation, bus 1006 may be implemented as a Peripheral Component Interconnect Express (PCIe) bus. Data processing system 1000 typically includes a variety of computer system readable media. Such media may include computer-readable volatile and non-volatile media and computer-readable removable and non-removable media.

Memory 1004 can include computer-readable media in the form of volatile memory, such as random-access memory (RAM) 1008 and/or cache memory 1010. Data processing system 1000 also can include other removable/non-removable, volatile/non-volatile computer storage media. By way of example, storage system 1012 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1006 by one or more data media interfaces. Memory 1004 is an example of at least one computer program product.

Memory 1004 is capable of storing computer-readable program instructions that are executable by processor 1002. For example, the computer-readable program instructions can include an operating system, one or more application programs, other program code, and program data. The computer-readable program instructions may implement any of the different examples of DBDG framework 100 described herein. Processor 1002, in executing the computer-readable program instructions, is capable of performing the various operations described herein that are attributable to a computer. It should be appreciated that data items used, generated, and/or operated upon by data processing system 1000 are functional data structures that impart functionality when employed by data processing system 1000. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor. Examples of data structures include images and meshes.

Data processing system 1000 may include one or more Input/Output (I/O) interfaces 1018 communicatively linked to bus 1006. I/O interface(s) 1018 allow data processing system 1000 to communicate with one or more external devices and/or communicate over one or more networks such as a local area network (LAN), a wide area network (WAN), and/or a public network (e.g., the Internet). Examples of I/O interfaces 1018 may include, but are not limited to, network cards, modems, network adapters, hardware controllers, etc. Examples of external devices also may include devices that allow a user to interact with data processing system 1000 (e.g., a display, a keyboard, a microphone for receiving or capturing audio data, speakers, and/or a pointing device).

Data processing system 1000 is only one example implementation. Data processing system 1000 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

Examples of various devices and/or systems that may be implemented using the hardware architecture illustrated in FIG. 10 and that execute the various executable frameworks described herein either individually or in combination with other devise can include one or more of a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television, information appliance, IoT device, server, a virtual reality (VR) system, an augmented reality (AR) system, a mixed reality (MR) system, an extended reality (XR) system, a metaverse system, or the like. In another example, the hardware architecture of FIG. 10 may be used to implement a kiosk configured with a video display and/or audio capabilities, or other computing or information appliance that may be positioned so as to be accessible by a plurality of different users over time.

The example of FIG. 10 is not intended to suggest any limitation as to the scope of use or functionality of example implementations described herein. Data processing system 1000 is an example of computer hardware that is capable of performing the various operations described within this disclosure. In this regard, data processing system 1000 may include fewer components than shown or additional components not illustrated in FIG. 10 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example hardware architecture illustrated by data processing system 1000 of FIG. 10 is not intended to suggest any limitation as to the scope of use or functionality of example implementations described herein. Data processing system 1000 is only an example of hardware architecture that is capable of performing the various operations described within this disclosure. In this regard, data processing system 1000 may include fewer components than shown or additional components not illustrated in FIG. 10 depending upon the particular type of device and/or system that is implemented. The particular operating system and/or application(s) included may vary according to device and/or system type as may the types of I/O devices included. Furthermore, one or more of the illustrative components may be incorporated into, or otherwise form a portion of, another component. For example, a processor may include at least some memory.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real-time" means a level of processing responsiveness that a user or system senses as sufficiently immediate for a particular process or determination to be made, or that enables the processor to keep up with some external process.

As defined herein, the term "responsive to" and similar language as described above, e.g., "if," "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the disclosed technology described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A computer-implemented method of synthesizing high-resolution data, the method comprising:

distorting, with a distortion function, a region of interest (ROI) within an input of inferential data, wherein the distorting generates distortion data within which the ROI is enhanced relative to other regions of the distortion data; and generating, by a generative artificial intelligence (AI) model, synthetic data, wherein the synthetic data defines a distorted object that is generated in response to input of the distortion data to the generative AI model;

wherein the generative AI model is trained against a distorted ground truth generated using the distortion function to distort one or more regions of interest (ROIs) within source data used to guide the generative AI model in generating the synthetic data.

2. The computer-implemented method of claim 1, wherein the distorted object is a distorted image, the method further comprising:

generating an undistorted image using an inverse distortion function applied to the distorted image.

3. The computer-implemented method of claim 2, wherein the distortion function is non-reversible, and wherein the inverse distortion function is estimated by fitting a polynomial to sampled points of the distorted object.

4. The computer-implemented method of claim 2, wherein the distortion data includes a distorted contour image having one or more landmarks, wherein the landmarks are distorted using the distortion function, and wherein the landmarks, as distorted, create the distorted contour image.

5. The computer-implemented method of claim 2, wherein the distortion data is multimodal data that includes a distorted contour image and undistorted audio data, and wherein the undistorted audio data drives generation of an ROI within the distorted image.

6. The computer-implemented method of claim 2, wherein the undistorted image is one of a plurality of undistorted images generated with the inverse distortion function, the method further comprising:

generating a video animation by sequentially rendering the plurality of undistorted images.

7. The computer-implemented method of claim 6, wherein the source data is an image of a human, and wherein the video animation is an animation of a digital human having features similar to the image of the human.

8. The computer-implemented method of claim 1, wherein the inferential data is audio data, wherein the ROI within the audio data comprises one or more segments of the audio data, and wherein the distorting enlarges the one or more segments relative to other segments of the audio data.

9. The computer-implemented method of claim 1, wherein distorting the inferential data encrypts the distortion data input to the generative AI model, and wherein the generative AI model encrypts the distorted object, the method further comprising:

conveying the distorted object over a communications network.

10. The computer-implemented method of claim 9, further comprising:

subsequent to conveying the distorted object, decrypting the distorted object using a reverse distortion function to eliminate distortion of the distorted object.

11. The computer-implemented method of claim 1, wherein the distortion function is a continuous monotonically non-decreasing function that distorts the ROI by generating at least one of a spline or radial expansion from an approximate center of the ROI.

12. A computer-implemented method of training a generative artificial intelligence (AI) model using data distortion, the method comprising:

identifying a region of interest (ROI) within an input of source data;

generating a distorted ground truth by distorting the source data, wherein the distorting is performed using a distortion function that enhances the ROI within the distorted ground truth relative to other regions of the distorted ground truth; and training the generative AI model to generate synthetic data, wherein the generative AI model learns to generate the synthetic data against the distorted ground truth, as distorted by the distortion function.

13. The computer-implemented method of claim 12, wherein the distortion function is a continuous monotonically non-decreasing function that distorts a ground truth by generating at least one of a spline or radial expansion from an approximate center of the ROI.

14. A system, comprising:

one or more processors configured to execute operations including:

distorting, with a distortion function, a region of interest (ROI) within an input of inferential data, wherein the distorting generates distortion data within which the ROI is enhanced relative to other regions of the distortion data; and generating, by a generative artificial intelligence (AI) model, synthetic data, wherein the synthetic data defines a distorted object that is generated in response to input of the distortion data to the generative AI model;

wherein the generative AI model is trained against a distorted ground truth generated using the distortion function to distort one or more regions of interest (ROI) within source data used to guide the generative AI model in generating the synthetic data.

15. The system of claim 14, wherein the distorted object is a distorted image, and wherein the one or more processors are configured to initiate operations further including:

generating an undistorted image using an inverse distortion function applied to the distorted image.

16. The system of claim 15, wherein the distortion data includes a distorted contour image having one or more landmarks, wherein the landmarks are distorted using the distortion function, and wherein the landmarks, as distorted, create the distorted contour image.

17. The system of claim 15, wherein the distortion data is multimodal data that includes a distorted contour image and undistorted audio data, and wherein the undistorted audio data drives generation of an ROI within the distorted image.

18. The system of claim 15, wherein the undistorted image is one of a plurality of undistorted images generated with the inverse distortion function, and wherein the one or more processors are configured to initiate operations further including:

generating a video animation by sequentially rendering the plurality of undistorted images.

19. The system of claim 18, wherein the source data is an image of a human, and wherein the video animation is an animation of a digital human having features similar to the image of the human.

20. The system of claim 14, wherein the inferential data is audio data, wherein the ROI within the audio data comprises one or more segments of the audio data, and wherein the distorting enlarges the one or more segments relative to other segments of the audio data.

* * * * *